US008634637B2

(12) United States Patent
Hirschmueller et al.

(10) Patent No.: US 8,634,637 B2
(45) Date of Patent: Jan. 21, 2014

(54) METHOD AND APPARATUS FOR REDUCING THE MEMORY REQUIREMENT FOR DETERMINING DISPARITY VALUES FOR AT LEAST TWO STEREOSCOPICALLY RECORDED IMAGES

(75) Inventors: Heiko Hirschmueller, Munich (DE);
Anko Boerner, Berlin (DE);
Maximilian Buder, Melchow (DE); Ines Ernst, Berlin (DE); Juergen Wohlfeil, Berlin (DE)

(73) Assignee: Deutsches Zentrum fuer Luft —Und Raumfahrt E.V., Cologne (DE)

( * ) Notice: Subject to any disclaimer, the term of this patent is extended or adjusted under 35 U.S.C. 154(b) by 305 days.

(21) Appl. No.: 13/255,948

(22) PCT Filed: Mar. 4, 2010

(86) PCT No.: PCT/EP2010/001598
§ 371 (c)(1),
(2), (4) Date: Sep. 12, 2011

(87) PCT Pub. No.: WO2010/102840
PCT Pub. Date: Sep. 16, 2010

(65) Prior Publication Data
US 2012/0002866 A1    Jan. 5, 2012

(30) Foreign Application Priority Data
Mar. 12, 2009  (DE) .......................... 10 2009 012 441

(51) Int. Cl.
*G06K 9/00*  (2006.01)
(52) U.S. Cl.
USPC ....................................................... 382/154
(58) Field of Classification Search
USPC ....................................................... 382/154
See application file for complete search history.

(56) References Cited

U.S. PATENT DOCUMENTS 7,512,262 B2 *  3/2009  Criminisi et al. ............. 382/154
7,570,804 B2 *  8/2009  Kim et al. ..................... 382/154

FOREIGN PATENT DOCUMENTS

DE    102008015535 A1    8/2008
DE    102008017834 A1    10/2008

OTHER PUBLICATIONS

Hirschmuller, H.; Scharstein, D., "Evaluation of Cost Functions for Stereo Matching," Computer Vision and Pattern Recognition, 2007. CVPR '07. IEEE Conference on , vol., no., pp. 1,8, Jun. 17-22, 2007 doi: 10.1109/CVPR.2007.383248.*

(Continued)

*Primary Examiner* — Utpal Shah
(74) *Attorney, Agent, or Firm* — Laurence A. Greenberg; Werner H. Stemer; Ralph E. Locher

(57) ABSTRACT

A method and an apparatus reduce the temporary random access memory required when determining disparity values for at least two stereoscopically recorded images with known epipolar geometry, in which a disparity is determined for each pixel of an image. Path-dependent dissimilarity costs are calculated on the basis of a disparity-dependent cost function, and compared, in two runs for a number of paths which open in the pixel. The disparity-dependent cost function evaluates a pixel-based dissimilarity measure between the pixel and the corresponding pixel, according to the respective disparity, in a second image. The path-dependent dissimilarity costs for a first predetermined set of disparities are calculated in a first run for a number of first paths and in a second run for a number of remaining paths, and the corresponding path-dependent dissimilarity costs of the first paths and of the remaining paths are accumulated for a second predetermined set of disparities.

9 Claims, 4 Drawing Sheets

(56) References Cited

OTHER PUBLICATIONS

Hirschmueller: "Stereo Processing by Semi-Global Matching and Mutual Information", IEEE Transactions on Pattern Analysis and Machine Initelligence, vol. 30(2), Feb. 2008, pp. 328-341.

Birchfield, et al: "Depth Discontinues by Pixel-To-Pixel Stereo", Proceedings to the Sixth IEEE International Conference on Computer Vision, Jan. 1998, pp. 1073-1080, Mumbai, India.

Zabith, et al: "Non-Parametric Local Transforms for Computing Visual Correspondence", Proceedings of the European Conference of Computer Vision, May 1994, pp. 151-158, Stockholm, Sweden.

Ernst, et al: "Mutual Information Based Semi-Global Stereo Matching on the GPU", International Symposium on Visual Computing (ISVC 2008), Part I, LNCS 5358, Springer-Verlag, pp. 228-239.

Wang, et al: "High-Quality Real-Time Stereo Using Adaptive Cost Aggregation and Dynamic Programming", Proceedings of the Third IEEE International Symposium on 3D Data Processing, Visualization and Transmission, Jun. 1, 2006, pp. 798-805.

Birchfield, et al: "Depth Discontinues by Pixel-To-Pixel Stereo", International Journal of Computer Vision, Kluwer Academic Publishers, XP007913059, Jan. 1999, vol. 35, No. 3, Norwell, USA.

* cited by examiner

METHOD AND APPARATUS FOR REDUCING THE MEMORY REQUIREMENT FOR DETERMINING DISPARITY VALUES FOR AT LEAST TWO STEREOSCOPICALLY RECORDED IMAGES

BACKGROUND OF THE INVENTION

Field of the Invention

The invention relates to a method and an apparatus for reducing the memory requirement for determining disparity values for at least two stereoscopically recorded images.

In stereo image processing, depth information is calculated from two or more images which are recorded from different perspectives, since said depth information has been lost during the projection of a scene onto an individual camera. Depth information is often also expressed in stereo image processing using disparities which are expressed by the shift which a corresponding pixel in an image experiences from another position and which is dependent on the distance (the depth) of the associated scene point. For the purpose of determining disparities in the stereo image processing, global and local methods exist. In this context, global methods usually provide significantly better quality for the disparity determination than local methods. However, global methods require greater computation complexity and more temporary main memory than local methods. This applies particularly in the case of large images and large disparity ranges. By contrast, local methods provide lower quality for the disparity determination but require much less computation complexity and memory requirement.

"Hirschmüller, H. (2008), Stereo Processing by Semi-Global Matching and Mutual Information, in IEEE Transactions on Pattern Analysis and Machine Intelligence, volume 30(2), February 2008, pp. 328-341" presents what is known as a semi-global matching (SGM) method. The SGM method combines the advantages of global and local approaches for determining disparities. In terms of the quality of the results, it is comparable with the best (usually global) methods at the present time. However, the computation complexity required is much lower than in the case of popular global methods with qualitatively comparable results. The SGM method is currently already used in many applications and is implemented in a field programmable gate array (FPGA) and on a graphical processing unit (GPU), inter alia.

The SGM method assumes a known epipolar geometry for the cameras used. It can be divided into a plurality of process steps, some of which are optional, depending on the application.

In a first step, dissimilarity costs are calculated for each pixel of a source image using a cost function, which may be based on what is known as mutual information (MI) or else on other costs, such as absolute differences. Alternatively, pixel-based measures of dissimilarity are conceivable which are based on the intensity of the pixel under consideration, for example what is known as the sampling insensitive measure, which is presented in "S. Birchfeld and C. Tomasi, Depth discontinuities by pixel-to-pixel stereo, in Proceedings of the Sixth IEEE International Conference on Computer vision, Mumbai, India, January 1998, pp. 1073-1080". A further cost function is described in "Zabih, R. and Woodfill, J. Non-parametric local transforms for computing visual correspondence. Proceedings of the European Conference of Computer Vision, May 1994, Stockholm, Sweden, pp. 151-158".

In a second step, dissimilarity cost aggregation is performed, which involves a global energy function being approximated by path-by-path optimization of all directions in the image. A third step involves the determination of a disparity for which the aggregation of dissimilarity costs is at a minimum. Further steps comprise the merging of more than two images and/or the refinement of the calculated disparities.

Since the presented invention allows a reduction in the memory requirement for the aggregation of dissimilarity costs, this process step based on the prior art will be explained in more detail below, in particular. In this case, a disparity dmin is determined for each pixel of a source image, which corresponds to the first of two stereoscopically recorded images, for example, by calculating path-dependent dissimilarity costs for typically eight one-dimensional paths which end in the pixel in two passes. In this context, path-dependent dissimilarity costs for each pixel are calculated for each disparity in a predetermined disparity range D, for example from 0 to 128. In this case, the path-dependent dissimilarity costs are ascertained using a disparity-dependent cost function which evaluates a pixel-based measure of dissimilarity between the pixel under consideration in the source image and the corresponding pixel, on the basis of the respective disparity, of a second, stereoscopically recorded image and dissimilarity costs for the precursor pixel on the path. The first pass typically involves path-dependent dissimilarity costs being calculated for four paths which end in the pixel under consideration in the source image. In this case, the directions of the paths cover the directions from the left, from the top left, from the top and from the top right. Typically, the source image is processed row by row from top to bottom, with each row being processed from left to right. For each direction, a number of dissimilarity costs are thus obtained for each pixel, said number corresponding to the number of disparities under consideration in the predetermined disparity range or the predetermined disparity depth D. These dissimilarity costs are set up at the time of execution of the first pass, are summed for the four directions separately for each pixel and each disparity and are temporarily buffer-stored for each pixel and each disparity. This results in a memory requirement of W×H×D values, where W is the number of pixels in the image width, H is the number of pixels in the image height and D is the number of disparity values under consideration on a pixel.

The second pass involves the source image now being processed row by row from bottom to top, with each row being processed from right to left. This involves path-dependent dissimilarity costs being calculated for each pixel of the source image for each disparity from the directions right, bottom right, bottom, bottom left and being summed for each pixel and each disparity to produce the costs for the first pass. When the second pass has concluded, the sum of the costs for all eight directions are therefore available for each pixel for each disparity. For each pixel, the resulting disparity is determined to be the disparity for which the sum of the costs over all eight directions is at a minimum.

A drawback of the SGM method is the high memory requirement and the associated high memory bandwidth, which hampers realtime capability in the method and simple implementation on an appropriate piece of hardware.

There are therefore a series of methods for reducing the computation time and memory requirement for determining disparity in stereo images. DE 10 2008 015 535 A1 presents a method for reducing the computation time of global stereo algorithms for the image processing of stereo images in which a first step involves image data from an original image being ascertained from two stereo images. The image data are used to determine a depth map for the original image at a reduced resolution. A second step involves a depth map for a selectable detail from the original image being ascertained at a maximum resolution.

DE 10 2008 017 834 A1 presents a method for determining correspondences between pixels in at least two stereoscopically recorded images, in which costs for a dissimilarity are calculated for each pixel in one of the images using intensities for the pixel and for a pixel considered to be potentially corresponding in the other image, wherein the costs are accumulated along a number of one-dimensional paths which end in the pixel, with that pixel from the pixels considered to be potentially corresponding in the other image being selected, for the purpose of creating a disparity map, for which a global energy which covers at least the costs of the dissimilarity is at a minimum, said pixel being divided into image details of size (n+1)×(m+1) for the purpose of determining the correspondences, wherein the costs accumulated in each of the one-dimensional paths are stored for each n-th row and m-th column, wherein a respective one of the image details is loaded, wherein the accumulated costs stored for an edge of the image detail are loaded, wherein the costs accumulated in each of the one-dimensional paths are recalculated for an inner instance of the image detail. The solution described reduces the memory requirement to 8×D×(H\n+W×H\m)+(n+1)×(m+1)×D for eight directions which are to be calculated. Even if this is much more favorable than the memory requirement W×H×D of the SGM method, the method continues to have drawbacks in relation to memory requirement and execution time for particular applications. Similarly disadvantageous for the method is the complex implementation, which hampers implementation on an FGPA and/or a GPU, for example.

BRIEF SUMMARY OF THE INVENTION

The invention is therefore based on the technical problem of providing a method and an apparatus for reducing the memory requirement—in a manner which is efficient in terms of memory—for determining disparity values for at least two stereoscopically recorded images which operate with no or only little loss of information.

In this case, the memory requirement is reduced for determining disparity values for at least two stereoscopically recorded images with known epipolar geometry by means of a method in which a disparity is determined for each pixel of a first image by calculating and comparing path-dependent dissimilarity costs using a disparity-dependent cost function in at least two passes for a number of paths which end in the pixel, wherein the disparity-dependent cost function evaluates at least one pixel-based measure of dissimilarity between the pixel and that pixel of a second image which corresponds on the basis of the respective disparity, wherein a first pass for a number of first paths and a second pass for a number of remaining paths involve the path-dependent dissimilarity costs being calculated for a first predetermined set of disparities and the relevant path-dependent dissimilarity costs for the first paths and the remaining paths being accumulated for a second predetermined set of disparities, wherein the resulting disparity is determined as a disparity for which an accumulation of path-dependent dissimilarity costs is at a minimum, wherein the second set of disparities is smaller than the first predetermined set of disparities, wherein the second set (N) of disparities contains at least one disparity on which the path-dependent dissimilarity costs for at least one first path are at a minimum for the path-dependent dissimilarity costs, and/or a disparity on which the path-dependent dissimilarity costs for at least one remaining path are at a minimum for the path-dependent dissimilarity costs, or the second set (N) of disparities contains at least one disparity which is remote in a predetermined manner from a disparity on which the path-dependent dissimilarity costs for at least one first path are at a minimum for the path-dependent dissimilarity costs, and a disparity which is remote in a predetermined manner from a disparity on which the path-dependent dissimilarity costs for at least one remaining path are at a minimum for the path-dependent dissimilarity costs, wherein relevant path-dependent dissimilarity costs are accumulated for the second predetermined set of disparities following the first pass.

This advantageously allows all path-dependent dissimilarity costs for the first paths and the remaining paths to no longer be stored, since the path-dependent dissimilarity costs no longer need to be accumulated for the first predetermined set of disparities, which usually covers the entire disparity range. The second predetermined set of disparities contains disparities on which the path-dependent dissimilarity costs for each first path and/or for each remaining path are at a minimum for the path-dependent dissimilarity costs, for example.

A further preference is that the second predetermined set of disparities additionally contains at least one respective disparity that is adjacent to these disparities.

As an alternative to the minimum for the path-dependent dissimilarity costs, other criteria are also conceivable for selecting elements of the second predetermined set of disparities. By way of example, these describe the use of the third and/or fourth disparity remote from the disparity for which the path-dependent dissimilarity costs are at a minimum, in order to accumulate the path-dependent dissimilarity costs.

Alternatively or cumulatively, the second set of disparities thus contains at least one disparity which is remote in a predetermined manner from a disparity on which the path-dependent dissimilarity costs for at least one first path are at a minimum for the path-dependent dissimilarity costs. In this context, the at least one disparity can be determined, for example by adding or subtracting a predetermined absolute value to/from the disparity on which the path-dependent dissimilarity costs for at least one first path are at a minimum for the path-dependent dissimilarity costs. If a predetermined set of disparities are evaluated in a predetermined order for the purpose of determining path-dependent dissimilarity costs, for example, the at least one disparity can be determined, by way of example, to be the disparity which, in the predetermined order, is situated a predetermined number of disparities, for example two, three or four, in front of or behind the disparity on which the path-dependent dissimilarity costs for at least one first path are at a minimum for the path-dependent dissimilarity costs. In addition, the second set of disparities contains at least one disparity which, in a predetermined manner, is remote from a disparity on which the path-dependent dissimilarity costs for at least one remaining path are at a minimum for the path-dependent dissimilarity costs. In this case, the at least one disparity can be determined by adding or subtracting a predetermined absolute value to/from the disparity on which the path-dependent dissimilarity costs for at least one remaining path are at a minimum for the path-dependent dissimilarity costs, for example. If only a predetermined set of disparities is evaluated in a predetermined order for the purpose of determining path-dependent dissimilarity costs, for example, the at least one disparity can be determined, by way of example, to be the disparity which, in the predetermined order, is situated a predetermined number of disparities, for example, two, three or four, in front of or behind the disparity on which the path-dependent dissimilarity costs for at least one remaining path are at a minimum for the path-dependent dissimilarity costs.

Hence, the second predetermined set of disparities is smaller than the first predetermined set and constant; the memory requirement is thus independent of the disparity range.

In this context, following the first pass implies that path-dependent dissimilarity costs are accumulated directly after the first pass. In addition, following the first pass implies that path-dependent dissimilarity costs can be accumulated only in a third and/or fourth pass and/or further passes. It goes without saying that path-dependent dissimilarity costs can be accumulated directly after the third and/or fourth and/or further passes. Following the first pass also implies that path-dependent dissimilarity costs are accumulated in or directly after a second pass.

The number of paths is preferably eight, the number of first paths and the number of remaining paths preferably each being four. However, embodiments are also conceivable in which an asymmetric distribution, for example five first paths and three remaining paths, is chosen.

Furthermore, the method is not limited to the processing of the original images recorded by the stereo camera. In particular, it is also possible to determine disparity values for images which have been derived from the original images. By way of example, this covers edge images derived from the original images.

Furthermore, the epipolar geometry, which is necessary to represent the method, can also be determined in a preprocessing step which takes place before the method.

In one preferred embodiment, the first pass is followed by the first path disparity for which the respective path-dependent dissimilarity costs are at a minimum being determined for each of the first paths, being stored and being included in the second set of disparities, and the second pass is followed by a remaining path disparity for which the respective path-dependent dissimilarity costs are at a minimum being determined for each of the remaining paths, being stored and being included in the second set of disparities, and a third pass involves dissimilarity costs accumulated on the first path disparities and the remaining path disparities over each of the first paths being determined, and a fourth pass involves dissimilarity costs accumulated on the first path disparities and the remaining path disparities over each of the remaining paths being determined, wherein an overall minimum and the associated disparity as a resulting disparity are determined from the dissimilarity costs completely accumulated on the first path disparities and the remaining path disparities in this manner over first paths and remaining paths. The advantageous effect of this is that after the first pass only the disparities for which the respective path-dependent dissimilarity costs for the first paths are at a minimum need to be stored, and after the second pass only the disparities for which the respective path-dependent dissimilarity costs for the remaining paths are at a minimum need to be stored. This makes the memory requirement independent of the disparity range. In this context, it is possible to have the first and second passes and/or the third and fourth passes executed either in parallel or sequentially. In the case of parallel execution of the first and second passes and/or of the third and fourth passes, the advantageous result is acceleration of execution time. Preferably, parallel passes involve both stereoscopically recorded images with known epipolar geometry being rotated through 180°. In this case, path-dependent dissimilarity costs are determined in the second pass, for example, using the same process as in the first pass, the only difference being that in the second pass the path-dependent dissimilarity costs are determined for a 180-degree-rotated version of the stereoscopically recorded images with known epipolar geometry.

In one preferred embodiment, the second set of disparities contains a first path disparity for each first path and a remaining path disparity for each remaining path, wherein the first pass is followed by the first path disparity for which the respective path-dependent dissimilarity costs are at a minimum being determined for each of the first paths, being stored and being included in the second set of disparities and by the dissimilarity costs accumulated on the first path disparity over each of the first paths being stored as first path subcosts, and the second pass is followed by a remaining path disparity for which the respective path-dependent dissimilarity costs are at a minimum being determined for each of the remaining paths, being stored and being included in the second set of disparities and by the dissimilarity costs accumulated on the remaining path disparity over each of the remaining paths being stored as remaining path subcosts, wherein the storage is preceded by the dissimilarity costs which arise on the first path disparities in each of the remaining paths being added to the stored first path subcosts and by a first path minimum for the dissimilarity costs completely accumulated on the first path disparities in this manner over first paths and remaining paths being determined and being stored with the associated first path disparity, and a third pass involves the dissimilarity costs which arise on the remaining path disparities in each of the first paths being added to the stored remaining path subcosts, and an overall minimum and the associated disparity as a resulting disparity being determined from the dissimilarity costs completely accumulated on the remaining path disparity in this manner over first paths and remaining paths and from the first path minimum.

The advantageous result of this is that after the first pass only the dissimilarity costs accumulated on the first path disparity over each of the first paths and the associated first path disparities need to be stored, and after the second pass only the dissimilarity costs accumulated on the remaining path disparity over each of the remaining paths and the associated remaining path disparities need to be stored. This makes the necessary memory requirement independent of the disparity range. In addition, one advantageous result is that the consideration of first and remaining paths means that there is no loss of information when calculating optimum disparities. The determination and storage of a first path minimum and of the associated first path disparity after the second pass advantageously allow the dissimilarity costs accumulated on the remaining path disparities over each of the remaining paths and the associated remaining path disparities to use the same memory location as the dissimilarity costs and disparities stored in the first pass.

In a further preferred embodiment, the second set of disparities additionally contains at least one first path adjacent disparity, adjacent to the first path disparity, and at least one remaining path adjacent disparity, adjacent to the remaining path disparity, wherein the first pass is followed by at least one first path adjacent disparity, adjacent to the first path disparity, being determined for each first path and being included in the second set of disparities and additionally by the dissimilarity costs accumulated on at least one first path adjacent disparity, adjacent to the first path disparity, over each of the first paths being stored as first path adjacent subcosts, and the second pass is followed by at least one remaining path adjacent disparity, adjacent to the remaining path disparity, being determined for each remaining path and being included in the second set of disparities and additionally by the dissimilarity costs accumulated on at least one remaining path adjacent disparity, adjacent to the remaining path disparity, over each of the remaining paths being stored as remaining path adjacent subcosts, wherein the storage is preceded by the dissimilarity costs which arise on the first path adjacent disparities in each of the remaining paths being added to the stored first path adjacent subcosts and by the first path minimum being determined from the dissimilarity costs completely accumulated on the first path disparities and the first path adjacent disparities over first paths and remaining paths and being stored, and a third pass additionally involves the dissimilarity costs which arise on the remaining path adjacent disparities in each of the first paths being added to the stored remaining path adjacent subcosts, and an overall minimum and the associated disparity as a resulting disparity being determined from the dissimilarity costs completely accumulated on the remaining path disparities and the remaining path adjacent disparities in this manner over first paths and remaining paths and from the first path minimum. This advantageously allows the optimum disparity value to be able to be determined with subpixel accuracy.

In one alternative embodiment, the second set of disparities contains at least one first resulting disparity and at least one adjacent disparity, adjacent to the first resulting disparity, wherein determination of the overall minimum and the resulting disparity after the third pass is additionally followed by the overall minimum being stored as a first overall minimum, the resulting disparity being stored as the first resulting disparity and the dissimilarity costs accumulated on at least the adjacent disparity, adjacent to the first resulting disparity, over each of the first paths being stored as adjacent subcosts, and a fourth pass is followed by the dissimilarity costs accumulated on the adjacent disparity over each of the remaining paths being added to the adjacent subcosts, and a second overall minimum and the associated disparity as a second, resulting disparity being determined from the dissimilarity costs completely accumulated on the adjacent disparity in this manner over first paths and remaining paths and from the first overall minimum. This advantageously results in the resulting disparity being able to be determined with subpixel accuracy and in less memory space being required after the first and second passes.

In a further preferred embodiment, the second set of disparities contains a resulting first path disparity and a resulting remaining path disparity, wherein the first pass is followed by the first path disparity for which the respective path-dependent dissimilarity costs are at a minimum and the dissimilarity costs accumulated on the first path disparity over each of the first paths being determined as first path subcosts for each of the first paths, wherein the minimum for the first path subcosts is determined and stored and the associated disparity is stored as a resulting first path disparity and is included in the second set of disparities, and a second pass involves the remaining path disparity for which the respective path-dependent dissimilarity costs are at a minimum and the dissimilarity costs accumulated on the remaining path disparity over each of the remaining paths being determined as remaining path subcosts for each of the remaining paths, wherein the minimum for the remaining path subcosts is determined and stored and the associated disparity as a resulting remaining path disparity is stored and is included in the second set of disparities, wherein the storage is preceded by the dissimilarity costs which arise on the resulting first path disparity in each of the remaining paths being added to the minimum for the first path subcosts, and the dissimilarity costs completely accumulated on the resulting first path disparity in this manner over first paths and remaining paths being stored as a first path minimum, and a third pass involves the dissimilarity costs which arise on the resulting remaining path disparity in each of the first paths being added to the minimum for the remaining path subcosts, and an overall minimum and the associated disparity as a resulting disparity being determined from the dissimilarity costs completely accumulated on the resulting remaining path disparity in this manner over first paths and remaining paths and from the first path minimum. This advantageously ensures that dissimilarity costs and disparities do not need to be stored for each of the first paths and remaining paths.

In a further preferred embodiment, the second set of disparities additionally contains at least one disparity adjacent to the resulting first path disparity and at least one disparity adjacent to the resulting remaining path disparity, wherein the first pass is additionally followed by at least one disparity adjacent to the resulting first path disparity being determined and being included in the second set of disparities, and dissimilarity costs accumulated on the disparity adjacent to the resulting first path disparity over each of the first paths being stored as first path adjacent subcosts, and the second pass is additionally followed by at least one disparity adjacent to the resulting remaining path disparity being determined and being included in the second set of disparities and by the dissimilarity costs accumulated on the disparity adjacent to the resulting remaining path disparity over each of the remaining paths being stored as remaining path adjacent subcosts, wherein the storage is additionally preceded by the dissimilarity costs which arise on the disparity, adjacent to the resulting first path disparity, in each of the remaining paths being added to the first path adjacent subcosts and by the first path minimum being determined from the dissimilarity costs completely accumulated on the resulting first path disparity and on the disparity adjacent to the resulting first path disparity, in this manner over first paths and remaining paths and being stored with the associated disparity, and a third pass additionally involves the dissimilarity costs which arise on the disparity adjacent to the resulting remaining path disparity over each of the first paths being added to the remaining path adjacent subcosts, and an overall minimum and the associated disparity as a resulting disparity being determined from the dissimilarity costs completely accumulated on the resulting remaining path disparity and the disparity adjacent to the resulting remaining path disparity in this manner over first paths and remaining paths and from the first path minimum. This advantageously allows the resulting disparity to be able to be determined with subpixel accuracy, with dissimilarity costs and disparities not needing to be stored for all paths.

In a further preferred embodiment, at least one memory write operation is preceded by compression of the data to be stored, and the memory read operation which reads the data stored in the memory write operation is followed by decompression of the stored data. This advantageously allows a reduction in the magnitude of the volume that is to be stored and a lowering of the demands on the memory bandwidth.

In order to carry out the method for reducing the temporary main memory for determining disparity values for at least two stereoscopically recorded images with known epipolar geometry, an apparatus comprises at least one memory unit and a computation unit which is connected to the memory unit for data communication purposes and in which a disparity is determined for each pixel of a first image by calculating and comparing the path-dependent dissimilarity costs using a disparity-dependent cost function in at least two passes for a number of paths which end in the pixel, wherein the disparity-dependent cost function evaluates at least one pixel-based measure of dissimilarity between the pixel and that pixel of a second image which corresponds on the basis of the respective disparity, wherein a first pass for a number of first paths and a second pass for a number of remaining paths involve the path-dependent dissimilarity costs being calculated for a first predetermined set of disparities and the relevant path-dependent dissimilarity costs for the first paths and the remaining paths being accumulated for a second predetermined set of disparities, wherein the resulting disparity is determined as a disparity for which an accumulation of path-dependent dissimilarity costs is at a minimum, wherein the second set of disparities is smaller than the first predetermined set of disparities, wherein the second set (N) of disparities contains at least one disparity on which the path-dependent dissimilarity costs for at least one first path are at a minimum for the path-dependent dissimilarity costs, and/or a disparity on which the path-dependent dissimilarity costs for at least one remaining path are at a minimum for the path-dependent dissimilarity costs, or the second set (N) of disparities contains at least one disparity which is remote in a predetermined manner from a disparity on which the path-dependent dissimilarity costs for at least one first path are at a minimum for the path-dependent dissimilarity costs, and a disparity which is remote in a predetermined manner from a disparity on which the path-dependent dissimilarity costs for at least one remaining path are at a minimum for the path-dependent dissimilarity costs, and wherein relevant path-dependent dissimilarity costs are accumulated for a second predetermined set of disparities following the first pass.

For further advantageous refinements of the apparatus, reference is made to the preceding comments relating to the method claims.

The invention is explained in more detail below with reference to a preferred exemplary embodiment. In the figures:

DESCRIPTION OF THE INVENTION

Figure 1:
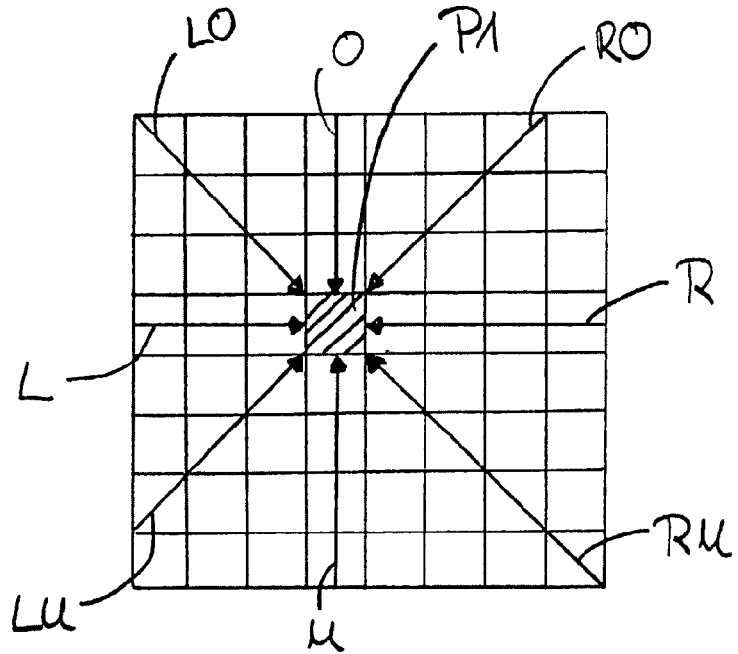
FIG. 1 shows a simplified illustration of the source image with eight paths.

For the specific embodiments below, path-dependent dissimilarity costs for paths from eight directions (K=8) which end in the pixel P1 are determined and evaluated, as shown in FIG. 1, for each pixel P1 of a source image which, by way of example, corresponds to the first image B1' from the two stereoscopically recorded images B1', B2' with known epipolar geometry. In this case, the directions of the paths comprise the directions from the left L, from the top left LO, from the top O, from the top right RO, from the right R, from the bottom right RU, from the bottom U and from the bottom left LU.

Figure 2:
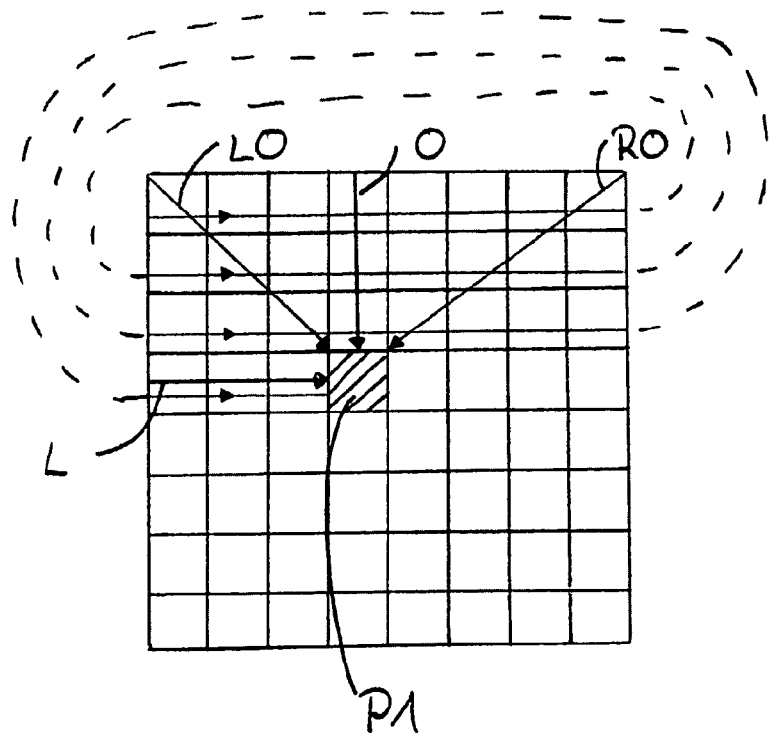
FIG. 2 shows a simplified illustration of the first pass with the four first paths.

In the first pass, path-dependent dissimilarity costs are determined for the four directions from the left L, from the top left LO, from the top O and from the top right RO (M=4). These directions are subsequently referred to as first paths. Accordingly, the four remaining directions R, RU, U, LU are referred to as remaining paths. As FIG. 2 shows, the first pass involves the source image, for example B1', being processed row by row from top to bottom, with each row being processed from left to right. For a particular disparity d in a disparity range D, the path-dependent dissimilarity costs for a path are determined, by way of example, to be the sum of a pixel-based measure of dissimilarity and particular path-dependent dissimilarity costs for the precursor pixel on the path. In this case, the pixel-based measure of dissimilarity can be calculated on the basis of mutual information (MI), for example. Alternatively, pixel-based measures of similarity are conceivable which are based on the intensity of the pixels under consideration, for example what is known as the sampling insensitive measure, which is presented in "S. Birchfeld and C. Tomasi, Depth discontinuities by pixel-to-pixel stereo, in Proceedings of the Sixth IEEE International Conference on Computer Vision, Mumbai, India, January 1998, pp. 1073-1080".

Alternatively, it is also conceivable to use other measures of dissimilarity, such as the measure presented in "Zabih, R. and Woodfill, J. Non-parametric local transforms for computing visual correspondence. Proceedings of the European Conference of Computer Vision, May 1994, Stockholm, Sweden, pp. 151-158".

Figure 3:
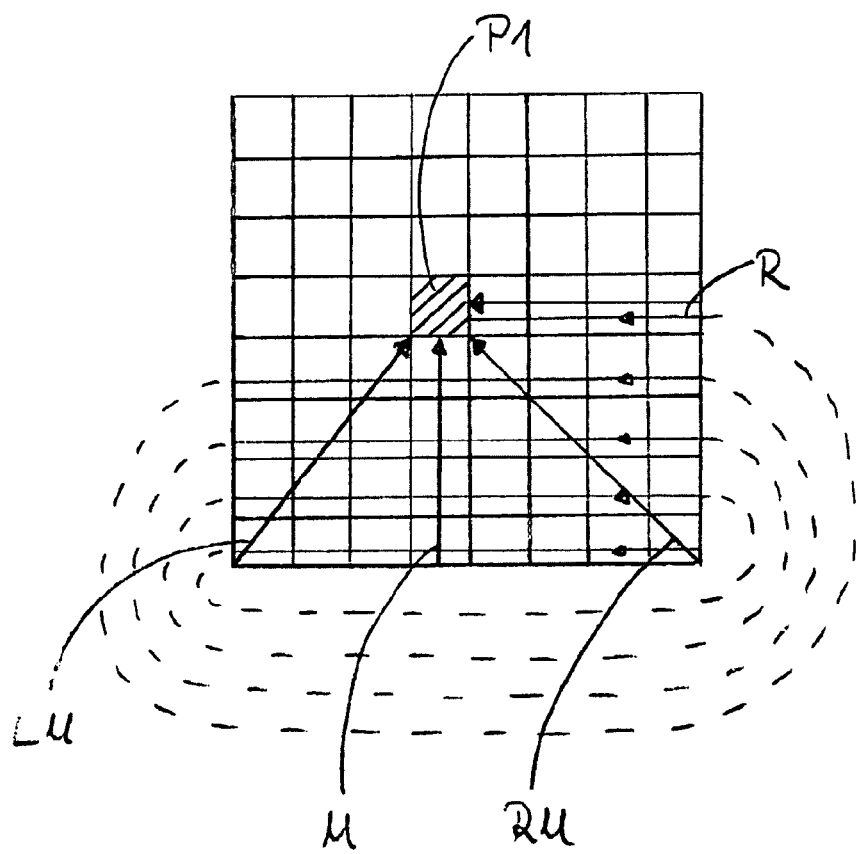
FIG. 3 shows a simplified illustration of the second pass with the four remaining paths.

The particular path-dependent dissimilarity costs for the precursor pixel can be calculated, by way of example, as the minimum from the group of path-dependent dissimilarity costs for the precursor pixel on the disparity d, path-dependent dissimilarity costs for the precursor pixel on the disparity d−1, path-dependent dissimilarity costs for the precursor pixel on the disparity d+1 and the minimum path-dependent dissimilarity costs for the precursor pixel over all disparities. In this context, the path-dependent dissimilarity costs for the precursor pixel on the disparities d−1 and d+1 have a first constant penal term applied to them, and the minimum path-dependent dissimilarity costs for the precursor pixel have a second penal term applied to them, which is either constant or dependent on the difference in intensity between the pixel under consideration and the precursor pixel. The path-dependent dissimilarity costs are determined for each pixel for each of the four first paths for each disparity at the time of execution of the first pass. In order to calculate the path-dependent dissimilarity costs, the path-dependent dissimilarity costs over the entire disparity range D need to be stored for the pass 1 for the paths from the top left LO, the top O and the top right RO, for each pixel of the precursor row. For the path from the left L, only the path-dependent dissimilarity costs for the precursor pixel over the entire disparity range D need to be stored in each case. This results in a main memory requirement of 3×W×D+D values for calculating the path-dependent dissimilarity costs for a pixel P. Theoretically, only the information from the adjacent pixels left L, top left LO, top O and top right RO is required for calculating the path-dependent dissimilarity costs for the pixel P1 for all disparities in the predetermined disparity range D. The storage of the path-dependent dissimilarity costs for all disparities d in a predetermined disparity range D for each pixel of the precursor row is a practical form of the implementation in this case. It should be noted that the precursor row does not necessarily correspond to the precursor image row, but rather denotes a memory area which has a magnitude of W and which contains path-dependent dissimilarity costs for all disparities d in the predetermined disparity range D for W pixels in the direction of passage, wherein the last pixel of the memory area is the second pixel in the opposite direction of passage from the pixel P1 under consideration. The calculation of path-dependent dissimilarity costs for the remaining paths in the second pass is effected in similar fashion. In this context, the source image, for example B1', as shown in FIG. 3, is processed row by row from bottom to top, with the rows being processed from right to left. Path-dependent dissimilarity costs are in this case determined for the directions from the right R, from the bottom right RU, from the bottom U and the from the bottom left LU. In order to determine a resulting disparity dmin from the path-dependent dissimilarity costs for the first paths which are being processed in the first pass and from the path-dependent dissimilarity costs for the remaining paths which are being processed in the second pass, the first pass is followed by the promise of a buffer-storage operation.

For the distribution of the paths, it is also possible to consider eight paths which end in the pixel P1, with the first pass involving the consideration of, by way of example, five paths (M=5), for example from the directions from the left L, from the top left LO, from the top O, from the top right RO and from the right R.

In a first specific exemplary embodiment, the first pass involves the path-dependent dissimilarity costs over the entire disparity range D for a pixel being ascertained for each of the first paths L, LO, O, RO. At the time of execution of the first pass, D path-dependent dissimilarity costs are thus ascertained for a first path. Overall, the first pass thus involves 4×D path-dependent dissimilarity costs being ascertained. From the ascertained 4×D path-dependent dissimilarity costs, the first path disparity d1, d2, d3, d4 for which the respective path-dependent dissimilarity costs UK1dk1 are at a minimum is ascertained for each of the first paths L, LO, O, RO. Instead of the 4×D path-dependent dissimilarity costs ascertained in the first pass, only first path disparities d1, d2, d3, d4 are now stored. This requires 4×1=4 instead of 4×D memory locations per pixel. Similarly, remaining path disparities d5, d6, d7, d8 are ascertained and stored. Overall, the second pass is thus followed by eight disparities being stored.

On the basis of this, the third pass involves accumulation of the dissimilarity costs which arise in each of the first paths on the respective disparity d1, d2, d3, d4, d5, d6, d7, d8. The second set N of disparities thus comprises eight elements, the first path disparities d1, d2, d3, d4 and the remaining path disparities d5, d6, d7, d8, in this case.

By way of example, the accumulation can be performed as an addition. For the first path disparity d1 for which the path-dependent dissimilarity costs UK1d1 for the first path L are at a minimum, the path-dependent dissimilarity costs for the path L on the disparity d1, the path-dependent dissimilarity costs for the path LO on the disparity d1, the path-dependent dissimilarity costs for the path O on the disparity d1 and the path-dependent dissimilarity costs for the path RO on the disparity d1 are thus summed. Following the accumulation in a third pass, the accumulated dissimilarity costs which arise in each of the first paths on the respective disparity d1, d2, d3, d4, d5, d6, d7, d8 are also stored in addition to the first path disparities d1, d2, d3, d4 and the remaining path disparities d5, d6, d7, d8. Similarly, the fourth pass involves accumulation of the dissimilarity costs which arise in each of the remaining paths on the respective disparity d1, d2, d3, d4, d5, d6, d7, d8. From the dissimilarity costs which have thus been completely accumulated for all first path disparities d1, d2, d3, d4 and remaining path disparities d5, d6, d7, d8 over all first paths and remaining paths, an overall minimum and the associated disparity as a resulting disparity dmin are determined.

In this specific embodiment, 8×2=16 memory locations per pixel are required for the buffer-storage. Overall, a memory requirement of 3×W×D+D+W×H×16 memory locations is obtained.

Preferably, the first and the second pass and/or the third and the fourth pass take place in parallel. In this case, path-dependent dissimilarity costs are determined in the second pass, for example, on the basis of the same procedure as in the first pass, the only difference being that in a second pass the path-dependent dissimilarity costs are determined on a 180-degree rotated version of the stereoscopically recorded images B1', B2' with known epipolar geometry. In particular, the second pass thus also involves path-dependent dissimilarity costs being determined from the directions L, LO, O, RO using the 180-degree rotated stereoscopically recorded images B1', B2' with known epipolar geometry. The procedure can also be performed in similar fashion for the fourth pass.

Figure 4:
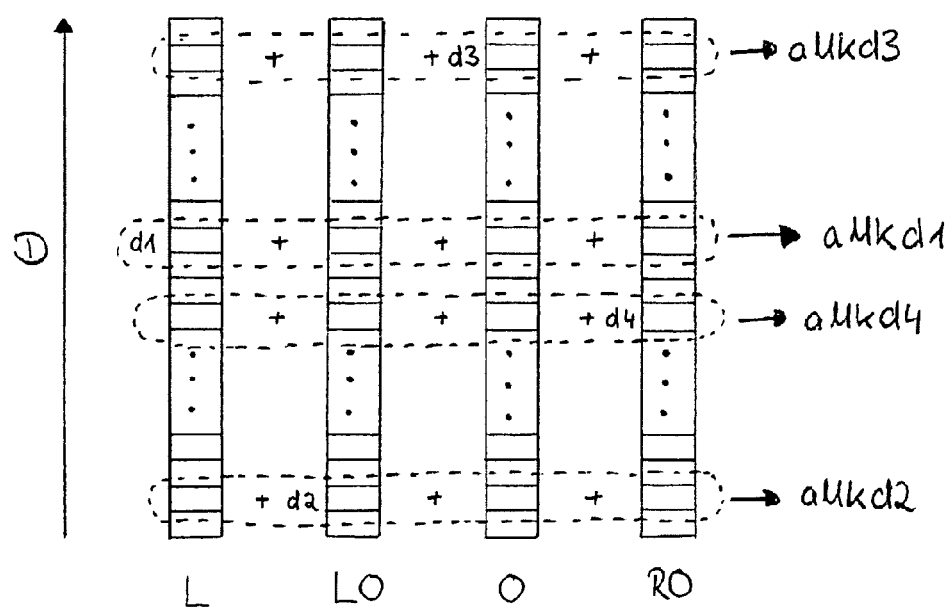
FIG. 4 shows a simplified illustration of the determination of first path subcosts in the first pass.

In a second specific exemplary embodiment, the first pass—as FIG. 4 shows—involves the path-dependent dissimilarity costs over the entire disparity range D being ascertained for each of the first paths. At the time of execution of the first pass, D path-dependent dissimilarity costs are thus ascertained for a first path. Overall, the first pass thus involves 4×D path-dependent dissimilarity costs per pixel being ascertained. From the ascertained 4×D path-dependent dissimilarity costs, the first path disparity dk1 for which the respective path-dependent dissimilarity costs UK1dk1 are at a minimum is ascertained for each of the first paths. In FIG. 4, the first path disparity d1 is shown for the first path L as the first path disparity for which the path-dependent dissimilarity costs for the path L are at a minimum. The further first path disparities d2, d3, d4 for the further first paths LO, O, RO are determined in similar fashion. Accordingly, the dissimilarity costs which arise in each of the first paths on the respective disparity d1, d2, d3, d4 are accumulated for each of the ascertained first path disparities d1, d2, d3, d4. The accumulation may, as FIG. 4 shows, be in the form of an addition, for example. For the first path disparity d1 for which the path-dependent dissimilarity costs UK1d1 for the first path L are at a minimum, the path-dependent dissimilarity costs for the path L on the disparity d1, the path-dependent dissimilarity costs for the path LO on the disparity d1, the path-dependent dissimilarity costs for the path O on the disparity d1 and the path-dependent dissimilarity costs for the path RO on the disparity d1 are thus summed. The thus summed path-dependent dissimilarity costs are subsequently referred to as first path subcosts aUK1d1. First path subcosts aUK1d2, aUK1d3, aUK1d4 are ascertained in similar fashion. Instead of the 4×D path-dependent dissimilarity costs ascertained in the first pass, the thus ascertained first path subcosts aUK1d1, aUK1d2, aUK1d3, aUK1d4 are now stored together with the associated first path disparities d1, d2, d3, d4. This requires 4×2=8 instead of 4×D memory locations per pixel. The first path subcosts aUK1d1, aUK1d2, aUK1d3, aUK1d4 comprise only information (path-dependent dissimilarity costs) for the first paths after the first pass. In order to completely determine the dissimilarity costs kUKd1, kUKd2, kUKd3, kUKd4 completely accumulated over all paths on the first path disparities d1, d2, d3, d4, it is also necessary to determine that path-dependent dissimilarity costs aUK2d1, aUK2d2, aUK2d3, aUK2d4 summed over all remaining paths on the first path disparities d1, d2, d3, d4 and to add them to the first path subcosts aUK1d1, aUK1d2, aUK1d3, aUK1d4. The second pass therefore involves two processes being carried out. First, in similar fashion to the first pass, remaining path disparities d5, d6, d7, d8 and remaining path subcosts aUK2d5, aUK2d6, aUK2d7, aUK2d8 are ascertained. At the same time, the path-dependent dissimilarity costs aUK2d1, aUK2d2, aUK2d3, aUK2d4 summed over all remaining paths on the first path disparities d1, d2, d3, d4 are added to the first path subcosts aUK1d1, aUK1d2, aUK1d3, aUK1d4 stored in the first pass. After the second pass, the dissimilarity costs kUKd1, kUKd2, kUKd3, kUKd4 completely accumulated over all eight paths on the first path disparities d1, d2, d3, d4 are therefore available. From these completely accumulated dissimilarity costs kUKd1, kUKd2, kUKd3, kUKd4, a first path minimum is then determined and is stored with the associated first path disparity from the group d1, d2, d3, d4. By way of example, the first path minimum is the minimum from the group of dissimilarity costs kUKd1, kUKd2, kUKd3, kUKd4 completely accumulated over all eight paths on the first path disparities d1, d2, d3, d4. Hence, two further memory locations are required. The memory locations described in the first pass are now used to store the remaining path disparities d5, d6, d7, d8 ascertained in the second pass and the associated remaining path subcosts aUK2$d$5, aUK2$d$6, aUK2$d$7, aUK2$d$8. After the second pass, however, the remaining path subcosts aUK2$d$5, aUK2$d$6, aUK2$d$7, aUK2$d$8 contain only information (path-dependent dissimilarity costs) for the remaining paths. In order to completely accumulate the path-dependent dissimilarity costs arising in all paths on the remaining path disparities d5, d6, d7, d8, a third pass is performed which processes the source image, for example B1', in similar fashion to pass 1. In this case, path-dependent dissimilarity costs aUK1$d$5, aUK1$d$6, aUK1$d$7, aUK1$d$8 summed over all first paths on the remaining path disparities d5, d6, d7, d8 are determined and are added to the stored remaining path subcosts aUK2$d$5, aUK2$d$6, aUK2$d$7, aUK2$d$8. After the third pass, the path-dependent dissimilarity costs arising on the remaining path disparities d5, d6, d7, d8 are accumulated over all paths. From a comparison of these completely accumulated costs kUKd5, kUKd6, kUKd7, kUKd8 with the stored first path minimum, it is therefore possible to determine an overall minimum and the associated disparity as a resulting disparity dmin. In this exemplary embodiment, the set N of second predetermined disparities comprises eight elements, namely four first path disparities d1, d2, d3, d4 and four remaining path disparities d5, d6, d7, d8. In this specific embodiment, 4×2+2=10 memory locations per pixel are required for the buffer-storage. Overall, a memory requirement of 3×W×D+D+W×H×10 memory locations is obtained.

In a further specific embodiment, the first pass is followed by the dissimilarity costs accumulated over each of the first paths on two first path adjacent disparities, for example d1−1 (d11) and d1+1 (d12), adjacent to the relevant first path disparity, for example d1 in the case of the first path from the left L, being additionally stored for each first path as first path adjacent subcosts aUK1$d$11 and aUK1$d$12. This means that, after the first pass, 4×4 memory locations are required, since the first path disparity d1, the dissimilarity costs aUK1$d$1 accumulated over all first paths on the first path disparity d1 and the dissimilarity costs aUK1$d$11, aUK1$d$12 accumulated over all first paths on the first path adjacent disparities d1−1, d1+1 need to be stored for each first path, for example L. The further first path disparities d2, d3, d4, first path adjacent disparities d21, d22, d31, d32, d41, d42, first path subcosts aUK1$d$2, aUK1$d$3, aUK1$d$4 and first path adjacent subcosts aUK1$d$21, aUK1$d$22, aUK1$d$31, aUK1$d$32, aUK1$d$41 and aUK1$d$42 are ascertained and stored in a similar fashion. In a similar manner to the first pass, the second pass involves remaining path adjacent disparities d51, d52, d61, d62, d71, d72, d81, d82 and remaining path adjacent subcosts aUK2$d$51, aUK2$d$52, aUK2$d$61, aUK2$d$62, aUK2$d$71, aUK2$d$72, aUK2$d$81, aUK2$d$82 being determined and additionally the dissimilarity costs which arise over each of the remaining paths on the first path adjacent disparities d11, d12, d21, d22, d31, d32, d41, d42 being added to the stored first path adjacent subcosts aUK1$d$11, aUK1$d$12, aUK1$d$21, aUK1$d$22, aUK1$d$31, aUK1$d$32, aUK1$d$41 and aUK1$d$42. From the path-dependent dissimilarity costs kUKd1, kUKd2, kUKd3, kUKd4, kUKd11, kUKd12, kUKd21, kUKd22, kUKd31, kUKd32, kUKd41, kUKd42 thus accumulated over all paths on the first path disparities d1, d2, d3, d4 and first path adjacent disparities d11, d12, d21, d22, d31, d32, d41, d42, it is now possible to determine and store a first path minimum and the associated disparity with subpixel accuracy. Similarly, the remaining path adjacent subcosts are now completed in the third pass, and an overall minimum and a resulting disparity dmin can now be determined with subpixel accuracy from the path-dependent dissimilarity costs kUKd5, kUKd6, kUKd7, kUKd8 accumulated over all paths on the remaining path disparities, the dissimilarity costs kUKd51, kUKd52, kUKd61, kUKd62, kUKd71, kUKd72, kUKd81, kUKd82 accumulated over all paths on the remaining path adjacent disparities and the first path minimum.

In this specific embodiment, 4×4+2=18 memory locations per pixel are thus required for the buffer-storage. Overall, a memory requirement of 3×W×D+D+W×H×18 memory locations is obtained. In this embodiment, the second set N comprises 24 elements, four first path disparities d1, d2, d3, d4 and eight respective associated first path adjacent disparities d11, d12, d21, d22, d31, d32, d41, d42 and also four remaining path disparities d5, d6, d7, d8 and eight respective associated remaining path adjacent disparities d51, d52, d61, d62, d71, d72, d81, d82.

In one alternative embodiment, the third pass is followed by the overall minimum as a first overall minimum and the resulting disparity dmin as a first resulting disparity dmin' being stored instead of the first path minimum and the associated disparity. In parallel, the path-dependent dissimilarity costs for the first paths—which dissimilarity costs are ascertained and available in the first pass over the entire disparity range D—are used to sum the path-dependent dissimilarity costs which arise on two adjacent disparities adjacent to the first resulting disparity dmin', for example dmin'−1 (dmin1) and dmin'+1 (dmin2), in all first paths. These first path adjacent subcosts aUK1$_d$min1, aUK1$_d$min2 can be stored using the memory locations which were used to store the remaining path adjacent subcosts aUK2$d$5, aUK2$d$6, aUK2$d$7, aUK2$d$8 ascertained after the second pass and the associated remaining path disparities d5, d6, d7, d8. Since the first path adjacent subcosts aUK1$d$min1, aUK1$d$min2 contain only information (path-dependent dissimilarity costs) for the first paths, a fourth pass becomes necessary. This fourth pass involves the path-dependent dissimilarity costs for the remaining paths aUK2$_d$min1, aUK2$d$min2—which dissimilarity costs arise on the adjacent disparities, in this case dmin1 and dmin2— being added to the stored first path adjacent subcosts aUK1$d$min1, aUK1$d$min2. From the path-dependent dissimilarity costs kUKdmin1, kUKdmin2 thus accumulated over all paths on the adjacent disparities, in this case dmin1 and dmin2, and the stored first overall minimum, it is now possible to determine a second overall minimum and the associated disparity as a second resulting disparity with subpixel accuracy. In this alternative, specific embodiment, 4×2+2=10 memory locations are required for the buffer-storage. Overall, 3×W×D+D+W×H×10 memory locations are thus required. Advantageously, this embodiment allows the resulting disparity to be determined with subpixel accuracy. The second set N of disparities in this case comprises ten disparities, four first path disparities d1, d2, d3, d4 determined in the first pass, four remaining path disparities d5, d6, d7, d8 determined in the second pass and two adjacent disparities dmin1, dmin2.

In a further specific embodiment, determination of the first path disparities d1, d2, d3, d4 and the first path subcosts aUK1*d*1, aUK1*d*2, aUK1*d*3, aUK1*d*4 is followed by the minimum for the first path subcosts aUK1*d*1min and the associated disparity d1min being determined from the group d1, d2, d3, d4 and stored. As a result, there are now only two memory locations required after the first pass. In similar fashion, the second pass involves the minimum for the remaining path subcosts aUK2*d*2 min and the associated remaining path disparity being determined from the group d5, d6, d7, d8 as d2min and stored, before the storage involving the path-dependent dissimilarity costs aUK2*d*1min which arise over all remaining paths on the first path disparity d1min stored in the first pass being added to the first path subcosts aUK1*d*1min stored in the first pass. The result of this addition kUKd1min and the associated first path disparity d1min are stored in two further memory locations. Hence, four memory locations per pixel are required after the second pass. A third pass involves the path-dependent dissimilarity costs aUK1*d*2min which arise in all first paths on the remaining path disparity d2min being added to the remaining paths subcosts aUK2*d*2min stored in the second pass. From the result of this addition kUKd2min and the stored value for the path-dependent dissimilarity costs kUKd1min completely accumulated over all paths on the first path disparity d1min, an overall minimum and the associated disparity are now determined. Overall, this embodiment requires four memory locations per pixel for the buffer-storage. The overall memory requirement is obtained from 3×W×D+D+W×H×4. In this case, the second set N of disparities comprises two disparities d1min, d2min.

In an extended embodiment, determination of the minimum for the first path subcosts aUK1*d*1min and the associated disparity d1min is likewise followed by two further first path adjacent subcosts aUK1*d*1min1, aUK1*d*1min2 being determined and stored. By way of example, the first path adjacent subcosts arise as a result of the addition of path-dependent dissimilarity costs which arise in the first paths on two disparities adjacent to the first path disparity d1min, for example dmin1−1 (d1min1) and dmin1+1 (d1min2). As a result, a total of four memory locations are required after the first pass. The second pass involves similar ascertainment of remaining path adjacent subcosts aUK2*d*2min1, aUK2*d*2min2 on two disparities adjacent to the remaining path disparity d2min, for example d2min−1 (d2min1) and d2min+1 (d2min2). At the same time, the path-dependent dissimilarity costs which arise in the remaining paths on the disparities d1min1, d1min2 adjacent to the resulting first path disparity d1min are added to the stored first path adjacent subcosts aUK1*d*1min1, aUK1*d*1min2. Subsequently, a first path minimum and the associated disparity are determined with subpixel accuracy from the dissimilarity costs kUKd1min, completely accumulated over all paths on the resulting first path disparity d1min, and the dissimilarity costs kUKd1min1, kUKd1min2, completely accumulated over all paths on the disparities d1min1, d1min2 adjacent to the resulting first path disparity d1min, and are stored. This requires two further memory locations. A third pass now involves the path-dependent dissimilarity costs aUK1*d*2min1, aUK1*d*2min2 which arise in each of the first paths on the disparities d2min1, d2min2 adjacent to the resulting remaining path disparity d2min being added to the remaining path adjacent subcosts aUK2*d*2min1, aUK2*d*2min2. From the first path minimum, the dissimilarity costs kUKd2min completely accumulated over all paths on the resulting remaining path disparity d2min and the dissimilarity costs kUKd2min1, kUKd2min2 completely accumulated over all paths on the disparities d2min1, d2min2 adjacent to the resulting remaining path disparity d2min, it is now possible to determine an overall minimum and a disparity with subpixel accuracy. This method requires 1×4+2=6 memory locations per pixel for the buffer-storage. Overall, 3×W×D+D+W×H×6 memory locations are required. In this case, the second set N of disparities comprises the disparities d1min and d2min and two respective adjacent disparities d1min1, d1min2, d2min1, d2min2, that is to say a total of six elements.

In a further preferred embodiment, the storage of data after the first and/or second and/or third pass is preceded by compression of the data that are to be stored. By way of example, the compression method may comprise a plurality of method steps. Thus, a first method step, that is known as the precoding phase, involves the data that are to be stored being linearized and being decorrelated using a linear predictor. Preferably, the data are linearized and decorrelated on the basis of a variable that is to be stored in which the least variance in the path-dependent dissimilarity costs occurs over the total volume of data that are to be stored. By way of example, these are the disparity values in the data that are to be stored. It goes without saying that it is also possible for the linearization to be dependent on other stored variables, such as the first path subcosts.

A second method step involves the residues, i.e. the prediction errors, being encoded. The encoder used for this purpose produces a prefix-free code of limited and variable word length. Preferably, a modified Golomb-Rice code is used for the encoding, the parameter for which code is ascertained statically using training sequences. These training sequences preferably comprise image data which provide the best reproduction of the scenery to be expected in the later application. In order to ensure the prerequisite of a strictly positive range of values for the Golomb-Rice encoder, an encoding preprocessing step is used to redistribute the residues over a strictly positive range of values by means of a modulo operation. A concluding method step is used to store the encoded output words in a ring buffer, for example, and to transfer them to the external memory in fixed block sizes. Conversely, the data are decompressed symmetrically with respect to the compression. The fixed and known parameter for the Golomb-Rice coding can be used to read the individual code words of variable length from the memory blocks and to count them back using the likewise known predictor.

The method of data compression prior to the storage of data can also be applied to the method presented in "Hirschmüller, H. (2008), Stereo Processing by Semi-Global Matching and Mutual Information, in IEEE Transactions on Pattern Analysis and Machine Intelligence, volume 30(2), February 2008, pp. 328-341". In this case, a first variant of the application involves the data that are to be stored being linearized on the basis of the disparity. This is an advantageous option, since the method described in "Hirschmüller, H. (2008), Stereo Processing by Semi-Global Matching and Mutual Information, in IEEE Transactions on Pattern Analysis and Machine Intelligence, volume 30(2), February 2008, pp. 328-341" stores path-dependent dissimilarity costs for all disparities in a predetermined disparity range D. At the same time, it can be assumed that the path-dependent dissimilarity costs for different disparities have a low level of variance and are therefore very well suited to compression. In a second variant of the application, the data that are to be stored are linearized on the basis of the pixel coordinates (x, y) of at least one of the stereo images, preferably of the source image B1'. In this case, the method of encoding is performed in similar fashion to the previously described encoding using a Golomb-Rice code.

Figure 5:
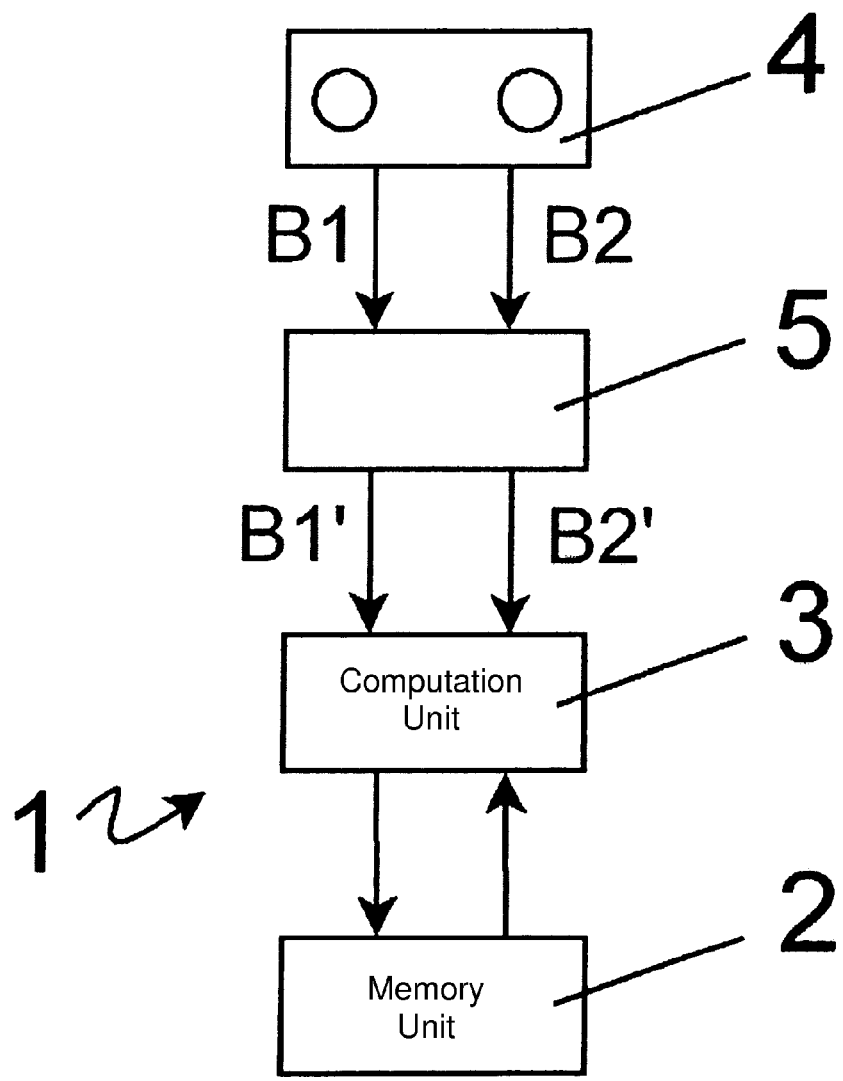
FIG. 5 shows a schematic block diagram of an apparatus for reducing the memory requirement.

The apparatus 1 for reducing the memory requirement for determining disparity values for at least two stereoscopically recorded images B1', B2' with known epipolar geometry is shown by way of example in FIG. 5. In this case, a stereo camera 4 acquires a first image B1 and a second image B2. A unit 5 for determining the epipolar geometry is connected for data communication purposes to the stereo camera 4 and determines the epipolar geometry of the stereoscopically recorded images B1, B2. The stereoscopically recorded images B1', B2' with known epipolar geometry are then transmitted by means of data communication to a computation unit 3. The computation unit 3 determines the disparity values for the stereoscopically recorded images B1', B2' with known epipolar geometry. The resultant data that are to be stored are temporarily buffer-stored in a memory unit 2. The memory unit 2 is connected for data communication purposes to the computation unit. The data to be stored comprise, inter alia, the path-dependent dissimilarity costs, such as the first path subcosts, remaining path subcosts, first path adjacent subcosts, remaining path adjacent subcosts and disparities, such as the first path disparities and remaining path disparities.

The apparatus 1 for reducing the memory requirement for determining disparity values for at least two stereoscopically recorded images B1', B2' with known epipolar geometry is—in one specific embodiment—a commercially available computer or a cluster of computers on which the method for reducing the memory requirement for determining disparity values for at least two stereoscopically recorded images B1', B2' with known epipolar geometry is implemented.

In a further specific embodiment, the computation unit of the apparatus 1 for reducing the memory requirement for determining disparity values for at least two stereoscopically recorded images B1', B2' with known epipolar geometry comprises one or more field programmable gate arrays (FPGA). By way of example, the apparatus 1 is in the form of a commercially available computer which has been extended by at least one FPGA card on which the method for reducing the memory requirement for determining disparity values for at least two stereoscopically recorded images B1' B2' with known epipolar geometry is implemented.

In a further specific embodiment, the computation unit of the apparatus 1 for reducing the memory requirement for determining disparity values for at least two stereoscopically recorded images B1', B2' with known epipolar geometry comprises one or more graphical processing units (GPU). By way of example, the apparatus 1 is in the form of a commercially available computer which has been extended by at least one graphics card on which the method for reducing the memory requirement for determining disparity values for at least two stereoscopically recorded images B1' B2' with known epipolar geometry is implemented.

In a further specific embodiment, the computation unit of the apparatus 1 for reducing the memory requirement for determining disparity values for at least two stereoscopically recorded images B1', B2' with known epipolar geometry comprises one or more application specific integrated circuits (ASIC).

The apparatus 1 for reducing the memory requirement for determining disparity values for at least two stereoscopically recorded images B1', B2' with known epipolar geometry can, by way of example, also be extended by a stereo camera system which acts as an input sensor and which allows real-time processing of the image data. In this case, the wavelength range of the mapping sensor, for example the stereo camera, is irrelevant. Preferably, systems which operate in the visible range or in the infrared range are used. This is important in collision avoidance systems in vehicles and aircraft, for example.

In a further embodiment, the apparatus 1 for reducing the memory requirement for determining disparity values for at least two stereoscopically recorded images B1', B2' with known epipolar geometry can be extended by an illumination device. This system can be used as a head tracker and/or eye tracker, which have inadequate illumination conditions to produce signals with adequate signal-to-noise ratio in the stereo camera system. One example application is head trackers in automobiles. In unfavorable weather conditions or when driving at night, these require active illumination to be switched on which illuminates the vehicle interior, particularly the vehicle driver. So as not to disturb the vehicle driver, light sources which operate in the near infrared range are usually used. The stereo camera system thus needs to be sensitive in the relevant wavelength range.

In a further exemplary embodiment, the apparatus 1 for reducing the memory requirement for determining disparity values for at least two stereoscopically recorded images B1', B2' with known epipolar geometry can be extended by a head-up display, the head-up display being controlled by the apparatus 1 according to the invention. By way of example, this is a vehicle system having an integrated navigation and information system, wherein the data are projected onto the windshield of a vehicle. In this case, the head position and/or eye position govern(s) to where the information needs to be projected.

In a further embodiment of the apparatus 1 for reducing the memory requirement for determining disparity values for at least two stereoscopically recorded images B1', B2' with known epipolar geometry, the apparatus 1 is extended by an inertial measurement system and/or another position and location measurement system, for example Galileo, GPS or Pseudolites, which acts as an input sensor in order to derive position and location data from the disparity maps so as in turn to control actuators using said data. This allows the braking behavior of the vehicle to be controlled, for example.

In a further embodiment, the apparatus 1 for reducing the memory requirement for determining disparity values for at least two stereoscopically recorded images B1', B2' with known epipolar geometry processes not the two stereoscopically recorded images B1', B2' with known epipolar geometry but instead the edge images (gradient images) derived from the two stereoscopically recorded images B1', B2' with known epipolar geometry. By way of example, these edge images can be produced using known edge detectors, such as the Roberts filter, the Sobel filter or the Laplacian filter.

In a further embodiment, the method for reducing the memory requirement for determining disparity values for at least two stereoscopically recorded images with known epipolar geometry is succeeded by a processing stage which extracts object edges and/or object corners by logically combining the two-dimensional image data from the stereoscopically recorded images and the 3D point clouds produced by the method.

In a further embodiment, the method for reducing the memory requirement for determining disparity values for at least two stereoscopically recorded images with known epipolar geometry is succeeded by a processing stage which uses modeling to generate three-dimensional objects (for example vehicles and/or buildings) from the three-dimensional point clouds which have been produced by the method.

In a further specific embodiment of the apparatus 1 for reducing the memory requirement for determining disparity values for at least two stereoscopically recorded images B1', B2' with known epipolar geometry, the epipolar geometry is calculated in a preprocessing step from the stereoscopically recorded images B1, B2 without known epipolar geometry.

The invention claimed is:

1. A method for reducing a temporary main memory for determining disparity values for at least two stereoscopically recorded images with known epipolar geometry, which comprises the steps of:

determining a disparity for each pixel of a first image by calculating and comparing path-dependent dissimilarity costs using a disparity-dependent cost function in at least two passes for a number of paths which end in the pixel, the disparity-dependent cost function evaluating at least one pixel-based measure of dissimilarity between the pixel and that pixel of a second image corresponding on a basis of a respective disparity, wherein a first pass for a number of first paths and a second pass for a number of remaining paths involve the path-dependent dissimilarity costs being calculated for a first predetermined set of disparities and relevant path-dependent dissimilarity costs for the first paths and the remaining paths being accumulated for a second predetermined set of disparities, wherein the disparity is determined as a disparity for which an accumulation of path-dependent dissimilarity costs is at a minimum;

forming the second predetermined set of disparities to be smaller than the first predetermined set of disparities, wherein the second predetermined set of disparities contains at least one disparity on which the path-dependent dissimilarity costs for at least one first path are at a minimum for the path-dependent dissimilarity costs, and/or a disparity on which the path-dependent dissimilarity costs for at least one remaining path are at a minimum for the path-dependent dissimilarity costs, or the second predetermined set of disparities contains at least one disparity which is remote in a predetermined manner from a disparity on which the path-dependent dissimilarity costs for the at least one first path are at a minimum for the path-dependent dissimilarity costs, and a disparity which is remote in a predetermined manner from a disparity on which the path-dependent dissimilarity costs for at least one remaining path are at a minimum for the path-dependent dissimilarity costs; and accumulating the relevant path-dependent dissimilarity costs for the second predetermined set of disparities following the first pass.

2. The method according to claim 1, which further comprises:

following the first pass with a first path disparity for which the respective path-dependent dissimilarity costs are at a minimum being determined for each of the first paths, being stored and being included in the second predetermined set of disparities;

following the second pass with a remaining path disparity for which the respective path-dependent dissimilarity costs are at a minimum being determined for each of the remaining paths, being stored and being included in the second predetermined set of disparities;

performing a third pass where dissimilarity costs are accumulated on the first path disparities and the remaining path disparities over each of the first paths; and performing a fourth pass wherein dissimilarity costs are accumulated on the first path disparities and the remaining path disparities over each of the remaining paths, wherein an overall minimum and an associated disparity as the resulting disparity are determined from the dissimilarity costs completely accumulated on the first path disparities and the remaining path disparities in this manner over first paths and remaining paths.

3. The method according to claim 1, wherein:

the second predetermined set of disparities contains a first path disparity for each of first path and a remaining path disparity for each remaining path;

the first pass is followed by the first path disparity for which the respective path-dependent dissimilarity costs are at a minimum being determined for each of the first paths, being stored and being included in the second set of disparities and by the dissimilarity costs accumulated on the first path disparity over each of the first paths being stored as first path subcosts;

the second pass is followed by a remaining path disparity for which the respective path-dependent dissimilarity costs are at a minimum being determined for each of the remaining paths, being stored and being included in the second predetermined set of disparities and by dissimilarity costs accumulated on the remaining path disparity over each of the remaining paths being stored as remaining path subcosts;

the storage is preceded by the dissimilarity costs which arise on the first path disparities in each of the remaining paths being added to the stored first path subcosts and by a first path minimum for the dissimilarity costs completely accumulated on the first path disparities in this manner over the first paths and the remaining paths being determined and being stored with the associated first path disparity;

a third pass involves the dissimilarity costs which arise on the remaining path disparities in each of the first paths being added to stored remaining path subcosts; and an overall minimum and the associated disparity as a resulting disparity being determined from the dissimilarity costs completely accumulated on the remaining path disparity in this manner over first paths and remaining paths and from the first path minimum.

4. The method according to claim 3, wherein:

the second predetermined set of disparities additionally contains at least one first path adjacent disparity, adjacent to the first path disparity, and at least one remaining path adjacent disparity, adjacent to the remaining path disparity;

the first pass is followed by the at least one first path adjacent disparity, adjacent to the first path disparity, being determined for each first path and being included in the second predetermined set of disparities and additionally by the dissimilarity costs accumulated on at least one first path adjacent disparity, adjacent to the first path disparity, over each of the first paths being stored as first path adjacent subcosts;

the second pass is followed by at least one remaining path adjacent disparity, adjacent to the remaining path disparity, being determined for each remaining path and being included in the second predetermined set of disparities and additionally by the dissimilarity costs accumulated on at least one remaining path adjacent disparity, adjacent to the remaining path disparity, over each of the remaining paths being stored as remaining path adjacent subcosts;

the storage is preceded by the dissimilarity costs which arise on the first path adjacent disparities in each of the remaining paths being added to the stored first path adjacent subcosts and by the first path minimum being determined from the dissimilarity costs completely accumulated on the first path disparities and the first path adjacent disparities over first paths and remaining paths and being stored;

a third pass additionally involves the dissimilarity costs which arise on the remaining path adjacent disparities in each of the first paths being added to the stored remaining path adjacent subcosts; and an overall minimum and the associated disparity as a resulting disparity being determined from the dissimilarity costs completely accumulated on the remaining path disparities and the remaining path adjacent disparities in this manner over first paths and remaining paths and from the first path minimum.

5. The method according to claim 3, wherein:

the second predetermined set of disparities contains at least one first resulting disparity and at least one adjacent disparity, adjacent to the first resulting disparity;

determination of the overall minimum and the resulting disparity after the third pass is additionally followed by the overall minimum being stored as a first overall minimum, the resulting disparity being stored as the first resulting disparity and the dissimilarity costs accumulated on at least the adjacent disparity, adjacent to the first resulting disparity, over each of the first paths being stored as adjacent subcosts;

a fourth pass is followed by the dissimilarity costs accumulated on the adjacent disparity over each of the remaining paths being added to the adjacent subcosts; and a second overall minimum and the associated disparity as a second, resulting disparity being determined from the dissimilarity costs completely accumulated on the adjacent disparity in this manner over first paths and remaining paths and from the first overall minimum.

6. The method according to claim 1, wherein:

the second predetermined set of disparities contains a resulting first path disparity and a resulting remaining path disparity;

the first pass is followed by the first path disparity for which the respective path-dependent dissimilarity costs are at a minimum and the dissimilarity costs accumulated on the first path disparity over each of the first paths being determined as first path subcosts for each of the first paths;

the minimum for the first path subcosts is determined and stored and the associated disparity is stored as a resulting first path disparity and is included in the second predetermined set of disparities, and a second pass involves the remaining path disparity for which the respective path-dependent dissimilarity costs are at a minimum and the dissimilarity costs accumulated on the remaining path disparity over each of the remaining paths being determined as remaining path subcosts for each of the remaining paths;

the minimum for the remaining path subcosts is determined and stored and the associated disparity as a resulting remaining path disparity is stored and is included in the second predetermined set of disparities; and the storage is preceded by the dissimilarity costs which arise on the resulting first path disparity in each of the remaining paths being added to the minimum for the first path subcosts and the dissimilarity costs completely accumulated on the resulting first path disparity in this manner over first paths and remaining paths being stored as a first path minimum;

a third pass involves the dissimilarity costs which arise on the resulting remaining path disparity in each of the first paths being added to the minimum for the remaining path subcosts; and an overall minimum and the associated disparity as a resulting disparity being determined from the dissimilarity costs completely accumulated on the resulting remaining path disparity in this manner over first paths and remaining paths and from the first path minimum.

7. The method according to claim 6, wherein:

the second predetermined set of disparities additionally contains at least one disparity adjacent to the resulting first path disparity and at least one disparity adjacent to the resulting remaining path disparity;

the first pass is additionally followed by at least one disparity, adjacent to the resulting first path disparity, being determined and being included in the second predetermined set of disparities, and dissimilarity costs accumulated on the disparity, adjacent to the resulting first path disparity, over each of the first paths being stored as first path adjacent subcosts;

the second pass is additionally followed by at least one disparity adjacent to the resulting remaining path disparity being determined and being included in the second predetermined set of disparities and by the dissimilarity costs accumulated on the disparity adjacent to the resulting remaining path disparity over each of the remaining paths being stored as remaining path adjacent subcosts;

the storage is additionally preceded by the dissimilarity costs which arise on the disparity, adjacent to the resulting first path disparity, in each of the remaining paths being added to the first path adjacent subcosts and by the first path minimum being determined from the dissimilarity costs completely accumulated on the resulting first path disparity and on the disparity adjacent to the resulting first path disparity, in this manner over first paths and remaining paths and being stored with the associated disparity;

a third pass additionally involves the dissimilarity costs which arise on the disparity adjacent to the resulting remaining path disparity over each of the first paths being added to the remaining path adjacent subcosts; and an overall minimum and the associated disparity as a resulting disparity being determined from the dissimilarity costs completely accumulated on the resulting remaining path disparity and the disparity adjacent to the resulting remaining path disparity in this manner over first paths and remaining paths and from the first path minimum.

8. The method according to claim 1, wherein at least one memory write operation is preceded by compression of data to be stored, and a memory read operation which reads the data stored in the memory write operation is followed by decompression of the stored data.

9. An apparatus for reducing the temporary main memory for determining disparity values for at least two stereoscopically recorded images with known epipolar geometry, the apparatus comprising:

at least one memory unit; and a computation unit connected to said memory unit for data communication purposes and in which a disparity is determined for each pixel of a first image by calculating and comparing path-dependent dissimilarity costs using a disparity-dependent cost function in at least two passes for a number of paths which end in the pixel, the disparity-dependent cost function evaluates at least one pixel-based measure of dissimilarity between the pixel and that pixel of a second image which corresponds on a basis of the respective disparity, wherein a first pass for a number of first paths and a second pass for a number of remaining paths involve the path-dependent dissimilarity costs being calculated for a first predetermined set of disparities and the relevant path-dependent dissimilarity costs for the first paths and the remaining paths being accumulated for a second predetermined set of disparities, wherein the resulting disparity is determined as a disparity for which an accumulation of path-dependent dissimilarity costs is at a minimum, the second predetermined set of disparities is smaller than the first predetermined set of disparities, the second predetermined set of disparities contains at least one disparity on which the path-dependent dissimilarity costs for at least one first path are at a minimum for the path-dependent dissimilarity costs, and a disparity on which the path-dependent dissimilarity costs for at least one remaining path are at a minimum for the path-dependent dissimilarity costs, or the second predetermined set of disparities contains at least one disparity which is remote in a predetermined manner from a disparity on which the path-dependent dissimilarity costs for at least one first path are at a minimum for the path-dependent dissimilarity costs, and/or a disparity which is remote in a predetermined manner from a disparity on which the path-dependent dissimilarity costs for at least one remaining path are at a minimum for the path-dependent dissimilarity costs, and wherein relevant path-dependent dissimilarity costs are accumulated for a second predetermined set of disparities following the first pass.

* * * * *

UNITED STATES PATENT AND TRADEMARK OFFICE
CERTIFICATE OF CORRECTION

Page 1 of 1

PATENT NO. : 8,634,637 B2
APPLICATION NO. : 13/255948
DATED : January 21, 2014
INVENTOR(S) : Heiko Hirschmueller et al.

It is certified that error appears in the above-identified patent and that said Letters Patent is hereby corrected as shown below:

In the Drawings:

Fig. 4 should be as follows:

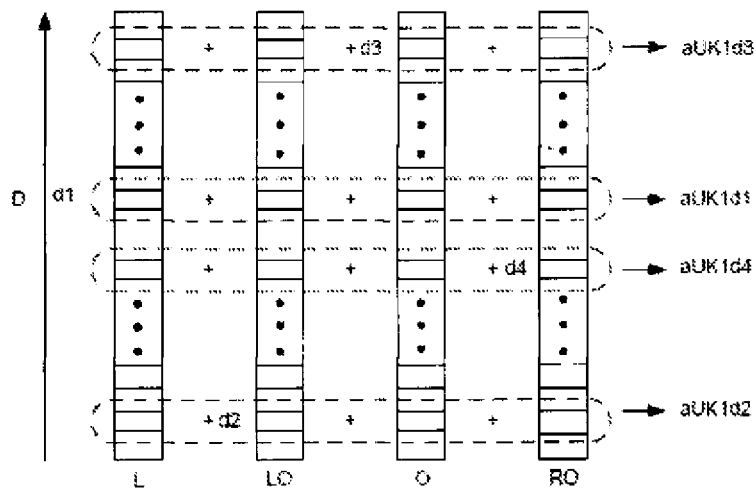

Signed and Sealed this
First Day of July, 2014

Michelle K. Lee
*Deputy Director of the United States Patent and Trademark Office*